# 2,746,243

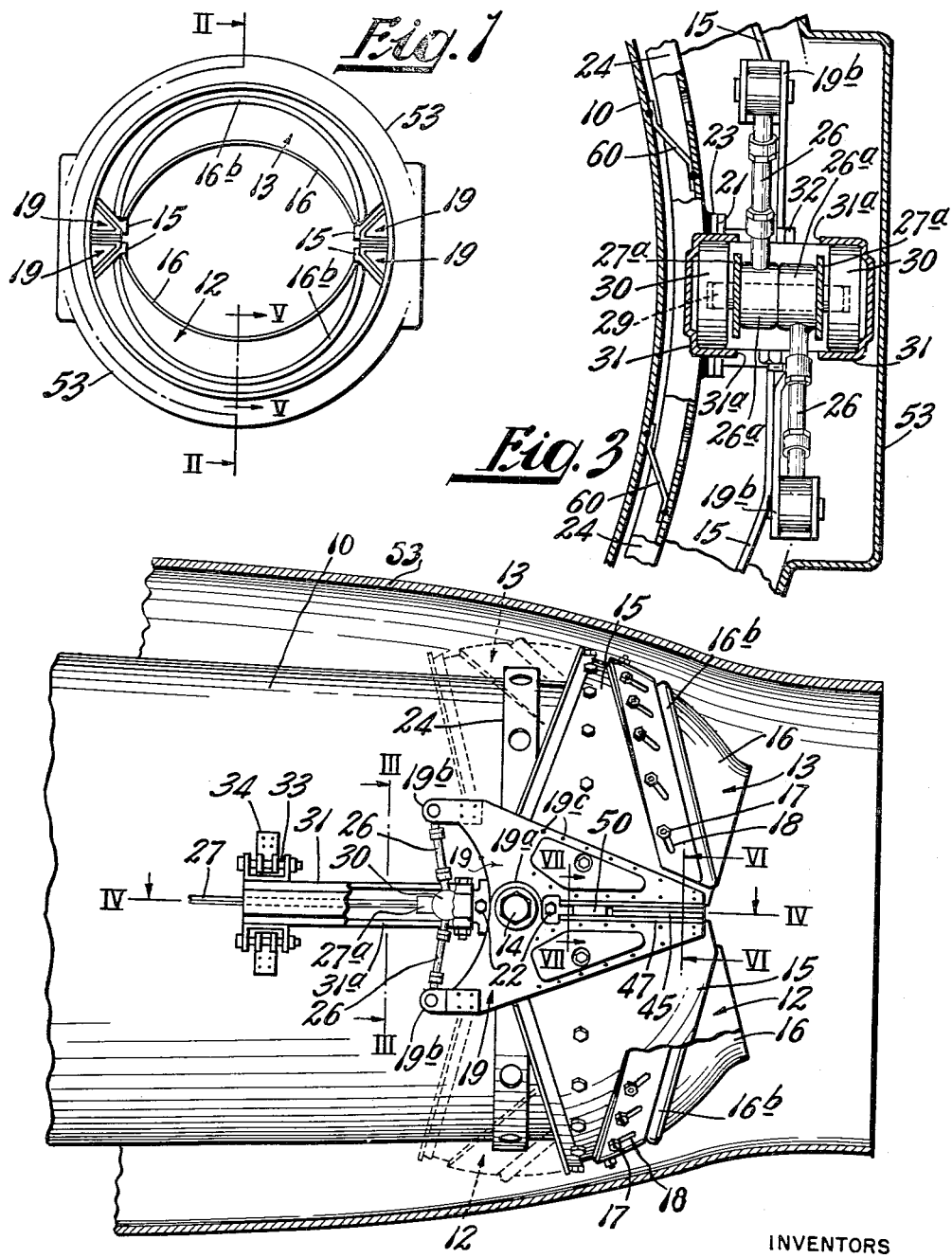

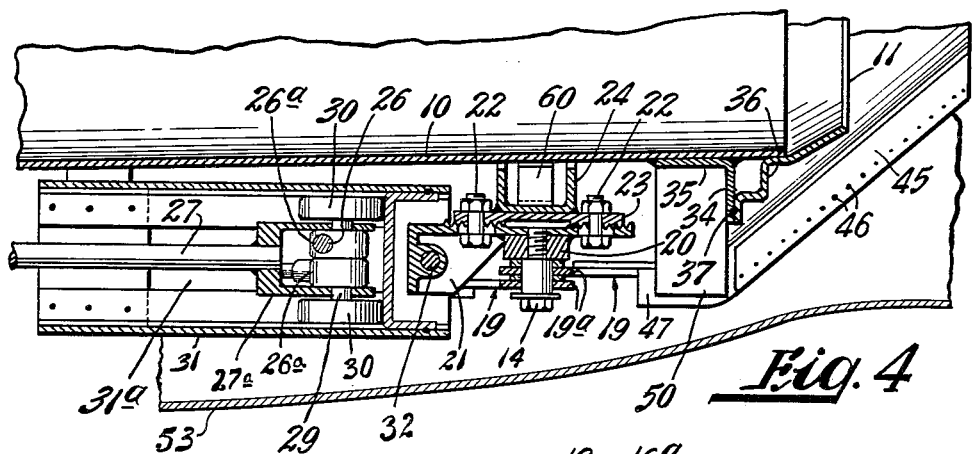
_Fig. 4_
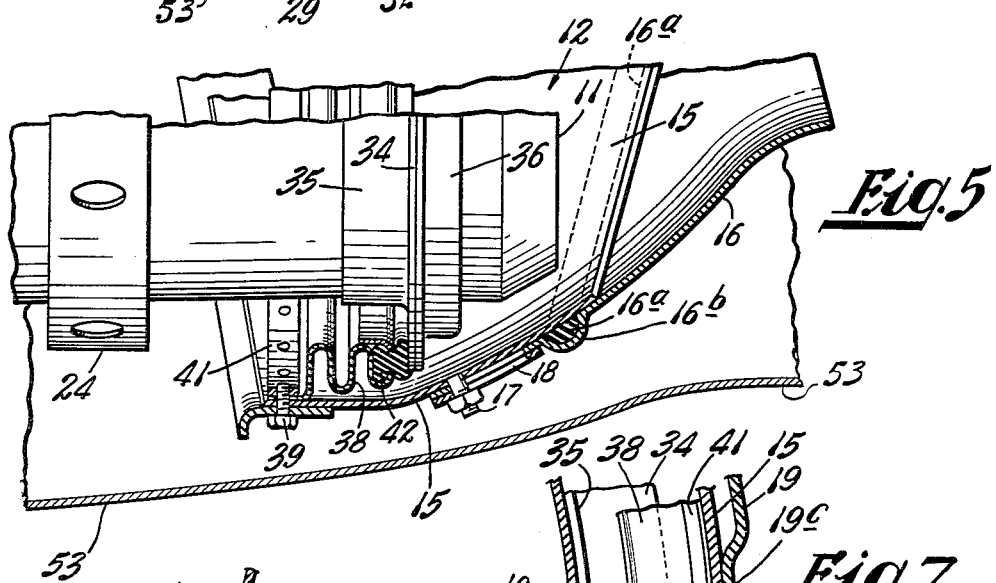
_Fig. 5_
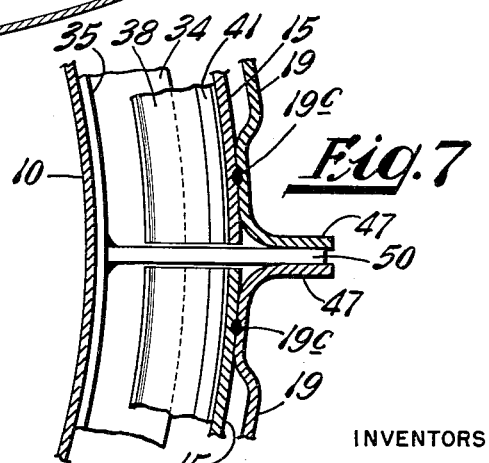
_Fig. 7_
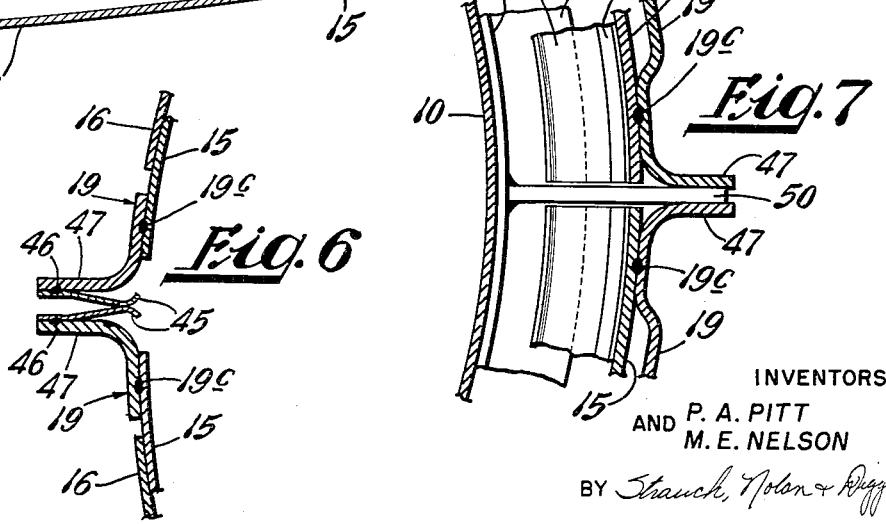
_Fig. 6_
INVENTORS
P. A. PITT
AND
M. E. NELSON
ATTORNEYS

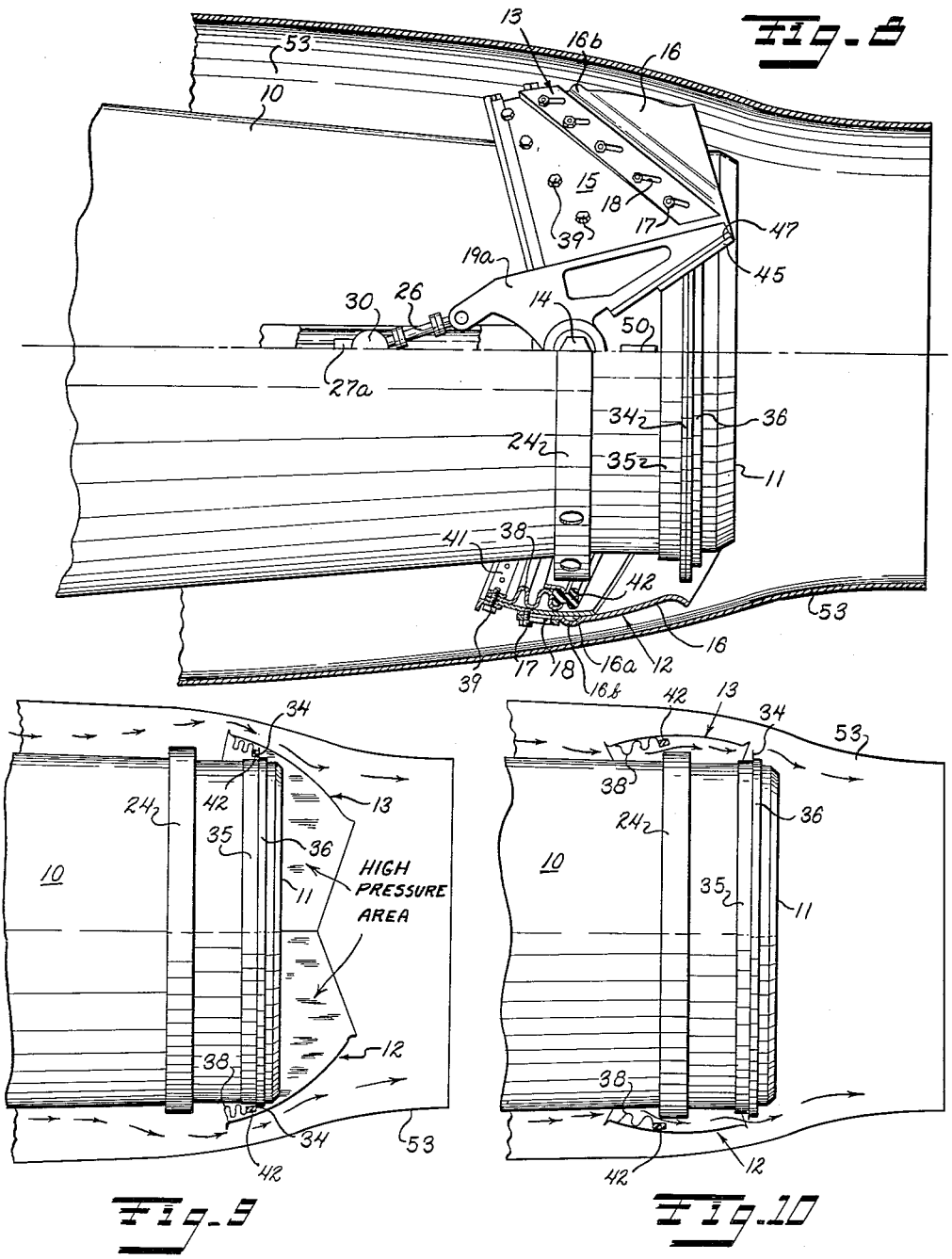

2,746,243

VARIABLE NOZZLE AND SEALING MEANS THEREFOR FOR JET ENGINE

Paul A. Pitt and Morris E. Nelson, San Diego, Calif., assignors to Solar Aircraft Company, San Diego, Calif., a corporation of California Application January 14, 1954, Serial No. 404,022

11 Claims. (Cl. 60—35.6)

This invention relates to reaction engines and more particularly to nozzle mechanisms for varying the area of the exhaust orifice in turbo-jet engines.

This application is a continuation-in-part of application Serial No. 59,944, filed November 13, 1948, now abandoned.

The present invention is primarily concerned with two-position nozzles for use with afterburner equipped engines although the invention in several respects is applicable to other types of variable nozzles. As is well known in the art, the performance of a turbo-jet engine depends to a large extent upon the correlation between the size of the exhaust orifice and the mass and velocity of the gases issuing therethrough. If the opening is too large a serious loss of thrust results and if the opening is too small, the engine may overheat to the point where excessive deterioration or, in extreme cases, destruction of the engine results.

The problems of nozzle control have been greatly magnified with the advent of the afterburner which is provided to augment the mass and velocity of the gases issuing from the primary engine. In a typical jet plane when the afterburner is cut in for a take-off, under emergency conditions, or in a combat maneuver large quantities of additional fuel are injected into the afterburner section and in the fraction of a second in which the afterburner ignites, the output of exhaust gases increases from about 2250 cubic feet per second to about 4200 cubic feet per second and in a very short time the temperature of the tailpipe may increase from 1200 to 1300° F. to 3000° F. or higher. These practically instantaneous changes in the mass and velocity and temperature of the exhaust gases disrupt the normal operating conditions of the primary engine, and, unless they are immediately compensated for, may result in the loss of the aircraft and its occupants.

In recognition of these problems many prior efforts have been addressed to the problem of providing means for varying the area of the exhaust orifice of a jet engine. However, all variable nozzles known before the present invention have proved unsatisfactory principally because of their failure to operate satisfactorily under the extremely high temperatures and pressures involved, because of their failure to observe practical weight limitations, or because the forces required to operate the nozzle necessitate the use of impractically large and expensive actuating mechanisms. Prior designs have also been ineffective because of their failure to provide for adequate cooling of the nozzle components and because of their failure to provide a structure which will function effectively despite the distortion produced by overheating or differential expansion.

In practice it has been found that when afterburning is initiated or shut off the nozzle must be moved to its new adjusted position in a matter of a second or two to prevent damage to the engine or serious loss of thrust. When it is considered that the nozzle components are of relatively large size and accordingly of large mass, and if there is appreciable friction of sliding contact surfaces, it will be appreciated that attainment of this speed of actuation could require unduly large actuating mechanisms.

It is accordingly, the major purpose and object of the present invention to provide improved variable area nozzles for jet engines which have improved structural integrity, performance and reliability in operation.

It is also an object of the invention to provide an improved two-position variable area nozzle assembly in which provision is made for cooling the movable parts to prevent distortion and binding in operation.

It is a further object to provide an improved two-position variable area nozzle assembly which forms a tight seal in closed position which in open position is broken to facilitate the flow of cooling air over the tailpipe and over both sides of the movable components of the nozzle.

It is an additional object of the invention to provide improved two-position variable area nozzles so constructed and arranged that the aerodynamic forces acting on the nozzle in operation permit its rapid movement from full open to closed position and provide a cushion or stop pressure to prevent impact damage.

It is a further object to provide an improved two-position variable nozzle having improved sealing means to prevent the leakage of high temperature exhaust gases.

It is also an object to provide an improved variable area nozzle in which the movable components are entirely withdrawn from the path of the exhaust gases during high temperature operation.

Further objects and advantages will become apparent as the description proceeds in connection with the accompanying drawings in which:

Figure 1 is a rear end elevation of a nozzle in accordance with the invention with a movable gate in closed position;

Figure 2 is a side elevation of the nozzle of Figure 1 taken along the line 2—2 of Figure 1 and showing the outer shroud in section and indicating the open position of the nozzle in dotted lines;

Figure 3 is a vertical sectional view taken along line 3—3 of Figure 2;

Figure 4 is a horizontal fragmentary section taken along line 4—4 of Figure 2;

Figure 5 is a fragmentary vertical section taken along line 5—5 of Figure 1;

Figures 6 and 7 are fragmentary sectional views showing details of the construction of the seals, the views being taken along lines 6—6 and 7—7, respectively, of Figure 2;

Figure 8 is a view similar to Figure 2 showing the nozzle in open position with the upper half in plan view and the lower half of the nozzle in section; and Figures 9 and 10 are diagrammatic illustrations of the nozzle showing the gates respectively in closed and open positions.

Briefly, the nozzle construction in accordance with the present invention comprises a fixed tubular nozzle which is sufficiently large to accommodate the flow of exhaust gases during afterburning in combination with a pair of gates of approximately spherical curvature which close over the end of the fixed nozzle to provide a nozzle opening of smaller diameter of a suitable size for accommodation of the exhaust gases during normal or nonafterburning operation. When the gates are in closed position a seal is formed along their two longitudinal straight edges where they meet and an annular seal is formed with a stationary nozzle structure at the rear circular edges of the gates. When the gates are in open position all of the seals are broken to facilitate the flow of cooling air over the inner and outer surface of the gates.

Referring now more specifically to the drawings 10 indicates the tailpipe of the engine which is provided at its outlet with a slightly reduced orifice 11. The tailpipe conducts the exhaust gases from the primary engine or from the secondary engine or afterburner if one is employed and is of sufficiently large size to accommodate the flow of gases during afterburning.

Movable gates 12 and 13 are pivotally mounted as at 14 on the tailpipe structure and swing about their pivotal mountings between an open position shown in Figure 8 and a closed position shown in full lines in Figures 1, 2, 4 and 9. In the latter position the downstream edges of the gates define an orifice of the proper size to accommodate the flow of exhaust gases during normal nonafterburning operation.

Each gate 12 or 13 consists of a main sheet member 15 of approximately spherical curvature and an outer, correspondingly curved sheet member 16 which is secured to the member 15 by bolts 17. An arcuate slot 18 is provided in the member 16 for each bolt 17, the radius of each slot being centered on the pivotal axis of the gate so that the extent to which the outer edge of the member 16 projects beyond the member 15 can be adjusted, thereby varying the size of the nozzle aperture produced by the closed gates. A gasket 16a fills a corrugation 16b in the member 16 and effects a seal between the members 15 and 16.

Each of the members 15 is secured at each of its opposite side edges to a hinge member 19 (Figures 2 and 7), as by spot welding indicated at 19c. The upper and lower hinge members 19 on each side have overlapping ears 19a that are hingedly connected together by the pivot pins 14 that extend through apertures provided therefor in the ears 19a. Thus as shown in Figure 4 the pin 14 may be in the form of a screw threaded into a boss 20 on a bracket plate 21 that is removably secured by bolts 22 to a bracket plate 23 that is welded to an annular supporting rib 24 of channel section which encircles the tube 10 and is secured thereto by tangential straps 60 positioned within the channel of the rib and welded at one end to the rib and at the other end to the tube 10 (Figure 3).

To open and close the gates 12 and 13, a rear extension 19b on each of the hinge members 19 is pivotally connected to a link 26 and the other ends of the links 26 are pivotally connected to the rear end of an actuating rod 27. Referring to Figure 4, the rear end of the rod 27 is provided with a clevis 27a which clevis encloses eyes 26a on the ends of the links 26. The eyes 26a are connected to the clevis 27a by a pin 29 which pin extends beyond the clevis at each end and supports a pair of guide rollers 30. These guide rollers 30 roll in a tunnel 31 of rectangular cross section, into which the rods 27 extend, the tunnel having slots 31a in its upper and lower sides, through which the links 26 project. The rear end of the tunnel 31 is connected by a pin 32 to the bracket 21 previously mentioned, and the forward end of tunnel 31 is connected by pins 33 to brackets 34 that are welded to the outer surface of the tube 10. It will be apparent from the foregoing description that forward movement of the control rods 27 (there is one on each side of the tube 10) moves the connected ends of the two links 26 forwardly to swing the hinge members 19 and the gates 12 and 13 connected thereto into the open position shown in Figure 8. On the other hand, rearward movement of the rod 27 moves the gates 12 and 13 into the closed position shown in full lines in Figure 2, and as the gates reach closed position, the links 26 constitute a toggle mechanism to provide a powerful closing force on the gates. As shown in Figure 2, in the closed position of the gates the inner end of links 26 supported on pin 29 are carried beyond the point of alignment with the outer ends of the links to lock the gates in closed position despite breakage of rod 27 or loss of actuating pressure thus providing a "fail safe" condition. The overtravel of the inner end of the links 26 has been exaggerated in Figure 2 for clarity.

When the gates 12 and 13 are in closed position the members 15 thereof seal with the main nozzle tube 10 as shown in Figure 5. Thus the tube 10 has welded thereto an annular member of L-shaped cross section, one flange 34 of which extends radially outward from the tube 10, and the other flange 35 of which lies against and is welded to the tube 10. The radial flange 34 is reinforced by an extension 36 of the orifice member 11, which is welded to the radial flange 34 near its outer edge as indicated at 37. The seal between the member 15 and the flange 34 is effected by a corrugated bellows 38 which is bolted at its front edge to the member 15 by bolts or screws 39 which extend through the member 15 and into an inner reinforcing ring 41 which lies against the thin bellows member 38. At its rear end, the bellows 38 is provided with a gasket 42 of some resilient, heat resisting material which gasket bears against the radial flange 34 when the gates are in closed position as shown in Figure 5.

When the gates are in open position as shown in Figures 8 and 10 the seal formed between the gasket 42 and the flange 34 is broken so that cooling air may flow between the gates and the tailpipe as well as over the outer surface of the gates, as will be more fully explained.

When the gates 12 and 13 are in closed position, the upper side edges of the lower gate 12 abut against the lower side edges of the gate 13 over most of the areas of those edges, and to provide a seal therebetween, flexible sealing strips 45 are provided which abut against each other when the gates are in closed position, as shown in Figure 6. These resilient sealing strips 45 are secured, as by welding 46 adjacent their outer edges, to outwardly extending flanges 47 on the hinge members 19. The sealing leaves 45 are urged into sealing contact with each other, not only because of their natural resiliency, but by any pressure existing within the nozzle.

Adjacent their rear ends, the flanges 47 on the hinge members 19 abut against one of two plates 50, which extend diametrically from opposite sides of the tube 10 just back of the radial flange 34. These plates assure that when the nozzle is closed the two gates 12 and 13 are symmetrically positioned with respect to the axis of the tube 10. It should also be noted in this connection that there must be accuracy of adjustment of the gates 12 and 13 for them to seal all around the circumferential ring at the same moment that the gates hit the two plates 50.

The gate sections 12 and 13 and the associated seals possess sufficient resiliency to maintain a tight seal despite the slight overtravel of the inner ends of the toggle links 26 to provide the "fail safe" condition described above.

The main tube 10 and the nozzle structure that has been described are enclosed in an outer tubular shroud 53 that is spaced from the inner structure so as to permit the circulation of cooling air therethrough and constitute a cooling shroud and radiation shield. The forward end of this shroud 53 (not shown) is open, and the rear end is open and projects beyond the orifice 11 and the ends of the gates 12 and 13. The rush of exhaust gas through the nozzle and the rear end of the shroud 53 induces a draft of air therethrough that functions to cool the parts. In addition, when the gates 12 and 13 are in their fully open position there is a clearance between the gates and the tube 10 which allows a portion of the cooling air passing through the shroud to be drawn under the gates to insure cooling of the most critical areas directly adjacent the end of the tube. These areas are critical since the distortion tendencies of the adjacent parts are greatly increased unless temperatures can be kept reasonably low. It is important to note here that the feature which allows cooling air to be drawn under the gates 12 and 13 in their open position is a very necessary one from a practical standpoint since cooling air requirements are very much greater during afterburning than during the normal or no-burning operation. During afterburning the 3000° F.

temperature of the gases would quickly melt the nozzle orifice if it were not cooled. Thus, the two-position nozzle embodied herein allows for maximum air pumping action during afterburning when the gates are open, and a reduced air flow which remains substantially proportional to the cooling or heat rejection requirements during normal operation when the gates are closed.

The flow of cooling air and the pressure areas during nonafterburning and afterburning conditions when the nozzle is, respectively, closed and open are illustrated in Figures 9 and 10. In Figure 9 the high pressure area is shaded. It will be seen from Figure 9 that the pressure within the gates is higher than that of the air surrounding the gates. Thus if it were not for the flexible seal formed by the packing 42 and the flange 34 the gases would flow between the gates 12 and 13 and the end of the tailpipe 10 toward the left as viewed in Figure 9. Leakage at this point, which is effectively prevented by the sealing arrangement above described, would result in a serious loss of thrust and would expose additional portions of the nozzle mechanism to the action of the high temperature exhaust gases.

In the open position it will be seen from Figure 10 that the packing 42 separates from the flange 34 and because of the aspirating effect of the gases flowing through nozzle 11 a flow of cooling air is induced between the tailpipe and the respective gates 12 and 13 as well as between the gates and the outer shroud. Thus, a flow of cooling air over the most critical areas directly adjacent the end of the tailpipe is insured which is greatest when cooling requirements are at a maximum. It should be noted that cooling of the gates in the open position is also effected by removing the gates from the path of the high temperature gas as opposed to many of the prior art devices. Excessive pressure forces on the gates when they occupy the retracted position are thus eliminated. In prior structures in which this is not accomplished these forces which are of considerable magnitude are transmitted to the supporting tailpipe which is operating at temperatures which reduce the material strength to a fraction of its room temperature strength. The present invention because of the provision of ample cooling of the entire nozzle assembly and tailpipe during afterburning and by the removal of the movable gate elements from the path of the exhaust gases provides a nozzle assembly which has longer service life, may be lighter in weight and is of greater reliability than presently known structures of this type.

As stated above, it is of primary importance that the nozzle be capable of extremely rapid actuation. For example, it should move through its range of movement in one second or less and this should be accomplished by the use of actuating mechanisms of minimum size. The attainment of these results for the first time in the art is an important feature of the present invention.

As pointed out above the movable gate assemblies are substantially hemispherical in shape. Accordingly the gas pressure forces acting normal to their surfaces will pass through the center of curvature lying on a line between the two hinge points. The resulting vector forces are thus resolved into a radial force passing through the center of the hinge point regardless of the position of the gate. Thus the gates are substantially in balance with respect to the pressure forces acting on them in all positions and an actuating force of minimum value is thus required to move the gates in either direction between open and closed positions.

Tests under actual operating conditions have demonstrated that due to the substantial balance of the major pressure forces the nozzle may be moved between full open and closed positions within one second with the use of small light weight actuating mechanisms and without impact damage to the gates when they reached closed position.

There are, however, several unbalanced forces acting on the gates which are used to advantage in the operation of the gates. First there is a relatively small aerodynamic force due to the passage of gases over the curved lips of the segments 16 which tends to swing the nozzle towards closed position. However, in the absence of any actuating force, the nozzle will be held in balance in a slightly open position because of two additional counter-forces. One of these is the sum of gas pressure loads that act over the area of the bellows 38 on the inner periphery of the gates. Another is the spring force resulting from the compression of the bellows 38 and side seals 45 when the gates approach the fully closed position. Both of these latter forces oppose and balance the light aerodynamic closing force within the last five or ten degrees of travel. The internal pressure forces which effectively act over the area of the bellows seal are shown by the shaded area in Figure 9.

It will be appreciated that the novel toggle action of the control mechanism when the nozzle is in the closed position gives assurance that the nozzle will remain closed even though the hydraulic system should be made inoperative. For example, in combat, should the hydraulic system of the nozzle actuator be disrupted, the forces acting against the inner surfaces of the gates will maintain the gates in closed position because of the toggle construction. In the absence of the toggle lock, the jet forces would move the gates radially outwardly to a semi-open position causing substantial thrust loss. Therefore, it should be understood that the toggle lock in the nozzle closed position is an important part of the invention.

Should the actuating system fail, the afterburning in progress and with the nozzle in the open position, the gates would tend to move toward the closed position because of the aerodynamic force produced by the passage of gases over the curved lips of the segments 16. However, under such conditions the pilot would immediately stop afterburning, the gates would assume the semi-closed position described above, and the power plant would have sufficient thrust to allow a considerable amount of useful flying time.

From the foregoing it will be seen that the above-stated objects of the invention have been accomplished by the provision of an improved two-position nozzle assembly which is of lightweight construction, susceptible of rapid actuation with relatively low actuating forces and which is adequately cooled during high temperature operation and thus has an extended service life.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A variable nozzle construction for a jet engine exhaust discharge comprising a tailpipe for conducting the exhaust stream and having a fixed discharge orifice; a pair of movable gate members disposed externally on opposite sides of said tailpipe adjacent its discharge orifice and shaped so as to form a sealed annular tailpipe extension with a reduced discharge orifice when positioned in a closed position with oppositely disposed mating portions in engagement; an annular exterior shoulder on said tailpipe; internal shoulders on said gate members for forming with said exterior shoulder a substantially annular gas tight seal when the gate members are in closed position; and mechanism for simultaneously shifting both gate members to a retracted position clear of the exhaust gases issuing from said fixed discharge orifice and with the respective shoulders on said gate members and said tailpipe in clearance relation to form a cooling air passage therebetween.

2. A nozzle construction according to claim 1 in which said internal shoulders on said gates each comprise a corrugated bellows secured at one edge to the gate and having at its other edge a gasket adapted to seal against the annular shoulder on said tailpipe.

3. A variable orifice nozzle construction for jet engine exhaust discharges comprising a tailpipe having a fixed discharge orifice for conducting the exhaust stream; a pair of movable gate members disposed externally on opposite sides of said tailpipe adjacent its discharge orifice and shaped so as to form a sealed annular tailpipe extension with a reduced orifice when positioned in a closed position with oppositely mating portions in engagement; outwardly extending flanges on said gate members adjacent said mating portions and adapted to closely approach each other in an axial plane of said tailpipe when the gates are in closed position; mating resilient sealing means on said flanges for sealing them with respect to each other when said gates are in closed position; additional sealing means mounted on said gate members and said tailpipe effective to maintain a seal therebetween only in the closed position of said gate members; and mechanism for shifting both gate members to a retracted position clear of the exhaust gases issuing from said fixed discharge orifice and to break said last mentioned seal to permit the passage of cooling air therethrough.

4. A nozzle construction according to claim 3 in which said sealing means on said flanges comprises elastic strips secured at their outer edges to said flanges and extending inwardly and away from said flanges into contact with each other when the gate members are in closed position.

5. A variable orifice nozzle construction for jet engine exhaust discharges comprising a tailpipe having a fixed discharge orifice for conducting the exhaust stream; a pair of movable gate members disposed externally on opposite sides of said tailpipe adjacent said discharge orifice and shaped so as to form a tailpipe extension with a reduced orifice when positioned in a closed position with oppositely mating portions in engagement; outwardly extending flanges on said gate members adjacent said mating portions and adapted to closely approach each other in an axial plane of said tailpipe when the gate members are in closed position; mating sealing means on said flanges for sealing them with respect to each other when said gate members are in closed position comprising elastic strips secured at their outer edges to said flanges and extending inwardly and away from said flanges into contact with each other when the gate members are in closed position; additional sealing means including diametrically outwardly extending flanges on said tailpipe adapted to be engaged between said outwardly extending flanges on said gate members forward of said sealing means when said gate members are in closed position; and mechanism for shifting both gate members to a retracted position clear of the exhaust gases issuing from said fixed discharge orifice.

6. A variable orifice nozzle construction for jet engine exhaust discharge comprising a tailpipe having a fixed discharge orifice for conducting the exhaust gas stream; a pair of movable gate members each comprising overlapping front and rear plates disposed externally on opposite sides of said tailpipe adjacent the discharge orifice shaped so as to form a sealed annular tailpipe extension with a reduced orifice when in a closed position; oppositely disposed mating sealing portions on said front plates adapted to sealingly engage when said gate members are in closed position; means securing said rear plates to the front plates for relative adjustable sliding movement with respect thereto whereby the size of the orifice defined by the gate members in closed position can be varied; and mechanism for shifting both gate members to a retracted position clear of the exhaust gases issuing from said fixed discharge orifice, said gate members being spaced from said tailpipe when the members are in retracted position to form a cooling air passage between said gate members and said tailpipe.

7. A variable orifice nozzle construction for jet engine exhaust discharge comprising a tailpipe for conducting the exhaust stream and having a fixed discharge orifice; a pair of movable gate members disposed externally on opposite sides of said tailpipe adjacent its discharge orifice and shaped so as to form a sealed annular tailpipe extension with a reduced discharge orifice when positioned in a closed position; oppositely disposed mating sealing members on said gate members adapted to be sealingly engaged in said closed position of said gate members; cooperating sealing means on said tailpipe and said gate members to maintain a substantially annular seal therebetween only in said closed position of said gate members; mechanism for shifting both gate members to a retracted position clear of said tailpipe discharge orifice and to separate said cooperating sealing means to form a cooling air passage between said gate members and said tailpipe when the gate members are in retracted position; and a cooling air shroud surrounding said tailpipe and gate members in the region of said shifting mechanism for supplying air to said cooling air passage to cool said gate members, said tailpipe and shifting means and to heat shield the enclosure normally housing the exhaust pipe.

8. A variable orifice nozzle construction for jet engine exhaust discharge comprising a tailpipe for conducting the exhaust stream and having a fixed discharge orifice; a pair of movable gate members disposed externally on opposite sides of said tailpipe adjacent its discharge orifice and shaped so as to form a sealed annular tailpipe extension with a reduced discharge orifice when positioned in a closed position with oppositely disposed mating portions in engagement; mechanism for shifting both gate members to a retracted position radially spaced from said tailpipe to form a cooling air passage therewith and clear of the exhaust gases issuing from said fixed discharge orifice; sealing structure on said tailpipe and said gate members effective to seal said gate members with each other and with said tailpipe when said gate members are in closed position; said sealing structure including relatively movable members which are separated in the retracted position of said gate members to form a cooling air passage between said gate members and said tailpipe.

9. The construction as defined in claim 8 in which at least a portion of said sealing structure is responsive to exhaust gas pressure to increase the sealing pressure when said gate members are in closed position.

10. In a variable discharge orifice construction for combustion engine exhaust gases; a tailpipe having a fixed discharge orifice; a pair of gate members of generally semi-spherical shape; hinge structure pivotally supporting said gate members on opposite sides of said tailpipe adjacent its orifice for swinging movement between an open position in which said gate members are clear of said tailpipe discharge orifice and a closed position in which the gate members constitute tailpipe extensions forming a discharge orifice of reduced size; an external annular shoulder on said tailpipe forward of the said discharge orifice; internal semi-circular shoulders on said gate members constituting an annular shoulder forward of said external shoulder when said gate members are in closed position; and sealing means affixed to one of said annular shoulders and facing the other of said annular shoulders for effecting a gas-tight seal between said annular shoulders only when said gate members are in closed position, said seal being broken to form a cooling air passage between said gate members and said tailpipe when said gate members are in open position.

11. A variable orifice nozzle construction for jet engine exhaust discharges comprising a tail pipe having a fixed discharge orifice for conducting the exhaust stream; a pair of movable gate members disposed externally on opposite sides of said tail pipe adjacent said discharge orifice and shaped so as to form a tail pipe extension with a reduced orifice when positioned in a closed position with oppositely mating portions in engagement; outwardly extending flanges on said gate members adjacent said mating portions and adapted to closely approach each other in an axial plane of said tail pipe when the gate members are in closed position; mating sealing means on said flanges for sealing them with respect to each other when said gate members are in closed position comprising elastic strips secured at their outer edges to said flanges and extending inwardly and away from said flanges into contact with each other when the gate members are in closed position; additional sealing means including diametrically outwardly extending flanges on said tail pipe adapted to be engaged between said outwardly extending flanges on said gate members forward of said sealing means when said gate members are in closed position; and mechanism for shifting both gate members to a retracted position clear of the exhaust gases issuing from said fixed discharge orifice.

References Cited in the file of this patent

UNITED STATES PATENTS

| | | |
|---|---|---|
| 1,294,690 | Meyer | Feb. 18, 1919 |
| 1,587,633 | Dennis | June 8, 1926 |
| 1,851,841 | Humphris | Mar. 29, 1932 |
| 2,397,999 | Goddard | Apr. 9, 1946 |
| 2,453,254 | Odin | Nov. 9, 1948 |
| 2,481,330 | Neal | Sept. 6, 1949 |
| 2,523,842 | Oulianoff | Sept. 26, 1950 |
| 2,551,372 | Haltenberger | May 1, 1951 |
| 2,603,060 | Brown | July 15, 1952 |
| 2,635,419 | Ambrose et al. | Apr. 21, 1953 |
| 2,637,972 | Laucher | May 12, 1953 |

FOREIGN PATENTS

| | | |
|---|---|---|
| 478,000 | Germany | June 5, 1929 |
| 171,600 | Great Britain | Nov. 24, 1921 |
| 502,872 | Great Britain | Mar. 24, 1939 |
| 586,571 | Great Britain | Mar. 24, 1947 |
| 587,513 | Great Britain | Apr. 29, 1947 |
| 588,501 | Great Britain | May 27, 1947 |